(12) United States Patent
DiBenedetto

(10) Patent No.: US 9,932,986 B2
(45) Date of Patent: Apr. 3, 2018

(54) VARIABLE PRELOADED DUPLEX THRUST BEARING SYSTEM FOR A GEARED TURBOFAN ENGINE

(71) Applicant: United Technologies Corporation, Farmington, CT (US)

(72) Inventor: Enzo DiBenedetto, Kensington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/229,423

(22) Filed: Aug. 5, 2016

(65) Prior Publication Data

US 2018/0038378 A1 Feb. 8, 2018

(51) Int. Cl.
| | |
|---|---|
| *F16C 27/04* | (2006.01) |
| *F04D 29/051* | (2006.01) |
| *F04D 29/059* | (2006.01) |
| *F16C 19/52* | (2006.01) |
| *F16C 19/54* | (2006.01) |
| *F16C 27/08* | (2006.01) |

(52) U.S. Cl.
CPC ......... *F04D 29/051* (2013.01); *F04D 29/059* (2013.01); *F16C 19/525* (2013.01); *F16C 19/54* (2013.01); *F16C 27/08* (2013.01); *F16C 2360/23* (2013.01)

(58) Field of Classification Search
CPC ...... F16C 19/18; F16C 19/181; F16C 19/182; F16C 19/183; F16C 19/54; F16C 19/542; F16C 19/56; F16C 25/083; F16C 27/04; F16C 27/08; F16C 2360/23; F01D 25/164
See application file for complete search history.

(56) References Cited

U.S. PATENT DOCUMENTS

| | | | | |
|---|---|---|---|---|
| 4,523,864 | A * | 6/1985 | Walter | F16C 19/54 384/513 |
| 8,182,156 | B2 | 3/2012 | Kinnaird et al. | |
| 8,727,632 | B2 | 5/2014 | Do et al. | |
| 8,820,046 | B2 | 9/2014 | Ross et al. | |
| 2008/0247699 | A1* | 10/2008 | Braun | F16C 19/54 384/504 |
| 2014/0099199 | A1* | 4/2014 | Kerr | F16C 33/6677 415/229 |
| 2015/0308510 | A1 | 10/2015 | Long et al. | |
| 2015/0362013 | A1* | 12/2015 | Gorajski | F02C 7/06 384/475 |

* cited by examiner

Primary Examiner — Phillip A Johnson
(74) Attorney, Agent, or Firm — Kinney & Lange, P.A.

(57) ABSTRACT

A bearing system for a gas turbine engine includes an outer housing and a first ball bearing assembly disposed radially inward from the outer housing relative a center axis of the outer housing. The bearing system also includes a second ball bearing assembly disposed radially inward from the outer housing and positioned axially aft of the first ball bearing assembly. The bearing system also includes a resilient member that is connected to the outer housing and compressed against at least one of a first outer race of the first ball bearing assembly and a second outer race of the second ball bearing assembly in an axial direction parallel to the center axis.

18 Claims, 5 Drawing Sheets

VARIABLE PRELOADED DUPLEX THRUST BEARING SYSTEM FOR A GEARED TURBOFAN ENGINE

BACKGROUND

The present disclosure relates to a gas turbine engine and, more particularly, to a thrust bearing system for a high pressure compressor section of the gas turbine engine that helps engine efficiency by decreasing bowed rotor shaft effects.

A gas turbine engine includes rotating spools or rotor shafts with blades that compress air needed for operation. One of the major goals in gas turbine engine fabrication is to optimize efficiency of the compressor and the turbine so that work is not lost. Tip leakage between the blades and the surround case is a significant source of engine inefficiency.

At shut-down of the gas turbine engine, the engine may cool unevenly. For example, the bottom part of the engine usually cools more quickly than the top portion of the engine as the heat within the engine migrates radially outward. This temperature differential in the gas turbine engine can cause the rotor shafts to distort and become eccentric relative to an engine center axis, taking on an effectively arcuate shape instead of being generally cylindrical. This phenomenon is also known as the "bowed rotor effect." A "bowed" rotor shaft is problematic at engine start-up because the distortions in the rotor shaft may result in the blades rubbing into the surrounding case or rub strip thereby creating larger gaps between the blade tips and the surrounding case and increasing tip leakage and engine inefficiency. In some cases, the eccentric movement of the bowed rotor shaft can also create gaps between many of the components in the compressor and/or turbine sections of the gas turbine engine that can also cause air leakage and decrease engine efficiency. In addition to increasing tip leakage and engine inefficiency, a bowed rotor can also create noise and vibrations felt in the airplane at start-up.

One method previously used to deal with the bowed rotor shaft problem is to "jack" the gas turbine engine at shut-down. Jacking the gas turbine engine at shut-down is done by using a drive to slowly rotate the rotor shaft after shut-down until the engine is cool. However, this method is inefficient because jacking requires the addition of the drive and a power source for the drive to the engine, thereby adding to the weight and complexity of the gas turbine engine. Another method used to deal with the bowed rotor shaft problem is to "motor" the bowed rotor shaft at start-up. Motoring the bowed rotor shaft involves drive starting the gas turbine engine, i.e., rotating the bowed rotor shaft up to running speed prior to the addition of fuel to the gas turbine engine. However, motoring the engine can lengthen the start time of the gas turbine engine and can still cause vibrations during start-up. Some prior art engines include a roller bearing assembly in addition to the thrust bearing assembly to help dampen and reduce the affects the bowed rotor shaft at start-up. However, roller bearing assemblies only dampen radial play of the bowed rotor shaft while still allowing axial play and slop of the bowed rotor shaft and blades.

SUMMARY

In one aspect of the disclosure, a bearing system for a gas turbine engine includes an outer housing having a forward end and an aft end. A first ball bearing assembly is disposed radially inward from the outer housing relative a center axis of the outer housing. The first ball bearing assembly includes a first outer race disposed radially inward from the outer housing, a first inner race disposed radially inward from the first outer race, and a first plurality of ball bearing elements disposed between the first outer race and the first inner race. The bearing system also includes a second ball bearing assembly disposed radially inward from the outer housing and positioned aft of the first ball bearing assembly. The second ball bearing assembly includes a second outer race disposed radially inward from the outer housing, a second inner race disposed radially inward from the second outer race, and a second plurality of ball bearing elements disposed between the second outer race and the second inner race. The bearing system also includes a resilient member connected to the outer housing. The resilient member is compressed against at least one of the first outer race and the second outer race in an axial direction parallel to the center axis.

In another aspect of the disclosure, a bearing system for a gas turbine engine includes an outer housing having a forward end and an aft end. The bearing system also includes a first ball bearing assembly disposed radially inward from the outer housing relative a center axis of the outer housing. The first ball bearing assembly includes a first outer race disposed radially inward from the outer housing, a first inner race disposed radially inward from the first outer race, and a first plurality of ball bearing elements disposed between the first outer race and the first inner race. The bearing system also includes a second ball bearing assembly disposed radially inward from the outer housing and positioned aft of the first ball bearing assembly. The second ball bearing assembly includes a second outer race disposed radially inward from the outer housing, a second inner race disposed radially inward from the second outer race, and a second plurality of ball bearing elements disposed between the second outer race and the second inner race. The bearing system also includes a spring. The spring is connected to the forward end of the outer housing by a fastener and contacts the first outer race. The spring is compressed axially between the fastener and the first outer race.

In another aspect of the disclosure, a bearing system for a gas turbine engine includes a radial spring and an outer housing. The outer housing includes a forward end and an aft end, the forward end of the outer housing being connected to the radial spring. The bearing system also includes a first ball bearing assembly, a second ball bearing assembly, and an axial spring. The first ball bearing assembly is disposed radially inward from the outer housing relative a center axis of the outer housing. The first ball bearing assembly includes a first outer race disposed radially inward from the outer housing, a first inner race disposed radially inward from the first outer race, and a first plurality of ball bearing elements disposed between the first outer race and the first inner race. The second ball bearing assembly is disposed radially inward from the outer housing and is positioned aft of the first ball bearing assembly. The second ball bearing assembly includes a second outer race disposed radially inward from the outer housing, a second inner race disposed radially inward from the second outer race, and a second plurality of ball bearing elements disposed between the second outer race and the second inner race. The axial spring is connected to the forward end of the outer housing by a fastener and contacts the first outer race. The axial spring is compressed axially between the fastener and the first outer race.

Persons of ordinary skill in the art will recognize that other aspects and embodiments of the present invention are possible in view of the entirety of the present disclosure, including the accompanying figures.

Figure 1:
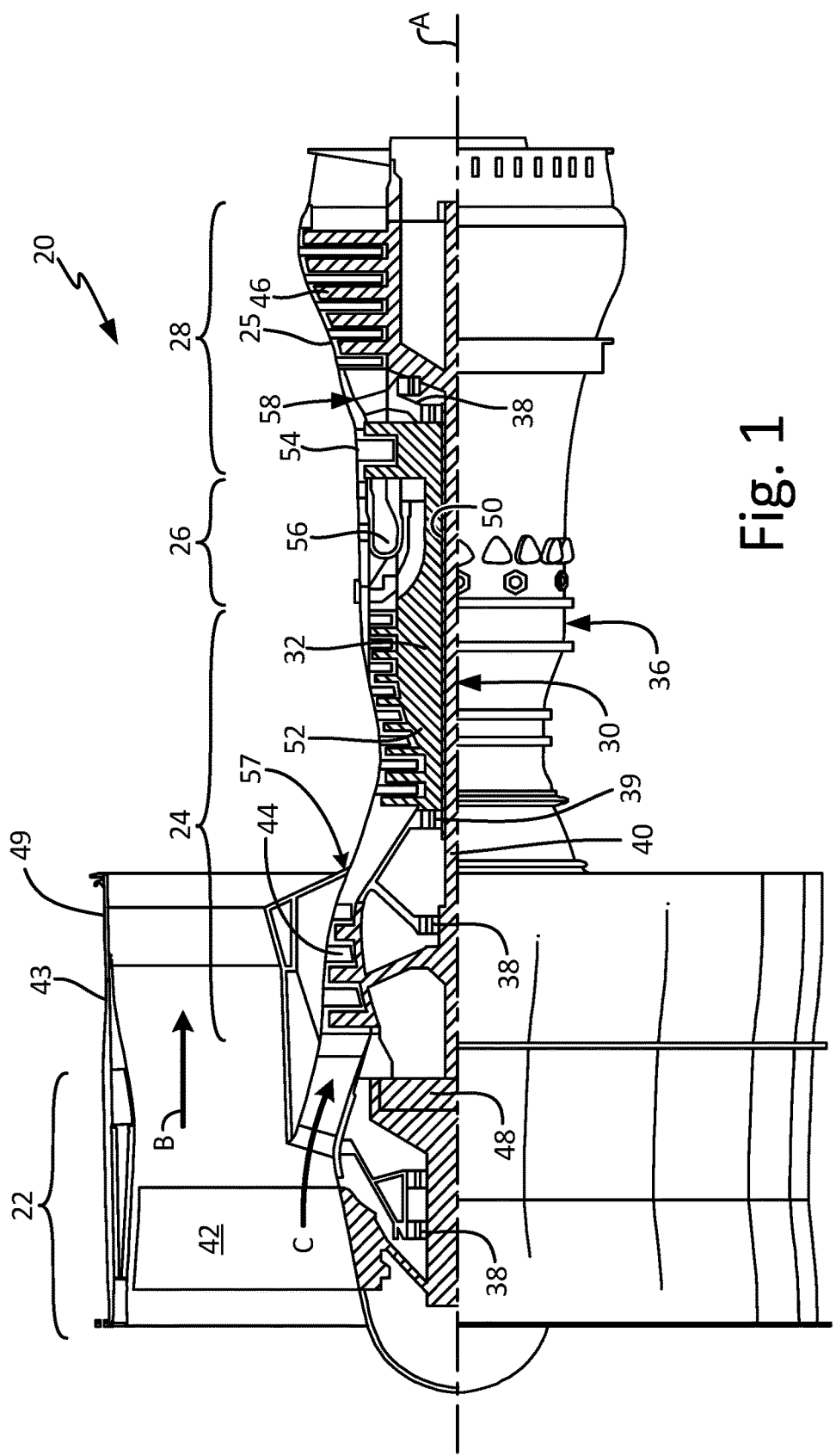
FIG. 1 is a partial cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The disclosure relates to a thrust bearing system in a high pressure compressor section of a gas turbine engine. The thrust bearing system includes a duplex ball bearing axially loaded by a preload spring and fully contained within a bearing housing. The duplex ball bearing is also radially loaded by a centering spring. The preloaded duplex ball bearing eliminates both axial and radial play of the rotor shaft and blades when the engine is cold and starting up and when the bowed rotor shaft phenomenon would manifest itself. By eliminating both axial and radial play of the rotor shaft and blades during engine start-up, the rotor shaft and blades are unable to vibrate due to bowed rotor shaft phenomenon and cut deeper into the outer case. Reducing axial and radial play in the high pressure compressor section of the gas turbine engine also helps reduce the gap size and leakage between components and seals in the high pressure compressor section. This arrangement also allows the use of a smaller rear ball bearing in a space that is constrained by the flow area requirements of the high pressure compressor. The thrust bearing system is discussed below with reference to the figures.

FIG. 1 schematically illustrates a gas turbine engine 20. Gas turbine engine 20 is a two-spool turbofan gas turbine engine that generally includes fan section 22, compressor section 24, combustion section 26, and turbine section 28. Other examples may include an augmentor section (not shown) among other systems or features. Fan section 22 drives air along bypass flowpath B while compressor section 24 drives air along a core flowpath C. Compressed air from compressor section 24 is directed into combustion section 26 where the compressed air is mixed with fuel and ignited. The products of combustion exit combustion section 26 and expand through turbine section 28.

Although the disclosed non-limiting embodiment depicts a two-spool turbofan gas turbine engine, it should be understood that the concepts described herein are not limited to use with two-spool turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Gas turbine engine 20 generally includes low-speed spool 30 and high-speed spool 32 mounted for rotation about a center axis A relative to engine static structure 36. Low-speed spool 30 and high-speed spool 32 are rotatably supported by bearing systems 38 and thrust bearing system 39. Low-speed spool 30 interconnects fan 42, low-pressure compressor 44, and low-pressure turbine 46. Low-speed spool 30 generally includes inner shaft 40, geared architecture 48, and fan drive shaft 68. Fan 42 is connected to fan drive shaft 68. Inner shaft 40 is connected to fan drive shaft 68 through geared architecture 48 to drive fan 42 at a lower speed than the rest of low-speed spool 30. Fan 42 is considered a ducted fan as fan 42 is disposed within duct 49 formed by fan case 43. Geared architecture 48 of gas turbine engine 20 is a fan drive gear box that includes an epicyclic gear train, such as a planetary gear system or other gear system. The example epicyclic gear train has a gear reduction ratio of greater than about 2.3 (2.3:1).

High-speed spool 32 includes outer shaft 50 that interconnects high-pressure compressor 52 and high-pressure turbine 54. Combustion section 26 includes a circumferentially distributed array of combustors 56 generally arranged axially between high-pressure compressor 52 and high-pressure turbine 54. In gas turbine engine 20, the core airflow C is compressed by low-pressure compressor 44 then high-pressure compressor 52, mixed and burned with fuel in combustors 56, then expanded over the high-pressure turbine 54 and low-pressure turbine 46. High-pressure turbine 54 and low-pressure turbine 46 rotatably drive high-speed spool 32 and low-speed spool 30 respectively in response to the expansion.

Intermediate frame 57 of engine static structure 36 is generally arranged axially between low-pressure compressor 44 and high-pressure compressor 52. Intermediate frame 57 supports bearing systems 38 and thrust bearing system 39 in the compressor 24 and provides a load path for transferring thrust loads from thrust bearing system 39 to fan case 43. Mid-turbine frame 58 of engine static structure 36 is generally arranged axially between high-pressure turbine 54 and low-pressure turbine 46. Mid-turbine frame 58 supports bearing systems 38 in the turbine section 28. Inner shaft 40 and outer shaft 50 are concentric and rotate via bearing systems 38 and thrust bearing system 39 about engine center axis A, which is collinear with the longitudinal axes of inner shaft 40 and outer shaft 50. As discussed below with reference to FIG. 2, thrust bearing system 39 is axially and radially loaded to eliminate both axial and radial play of inner shaft 40, outer shaft 50, and the rotor blades connected to those shafts in the compressor section 24 when the engine is cold and starting up and when the bowed rotor shaft phenomenon would manifest itself.

Figure 2:
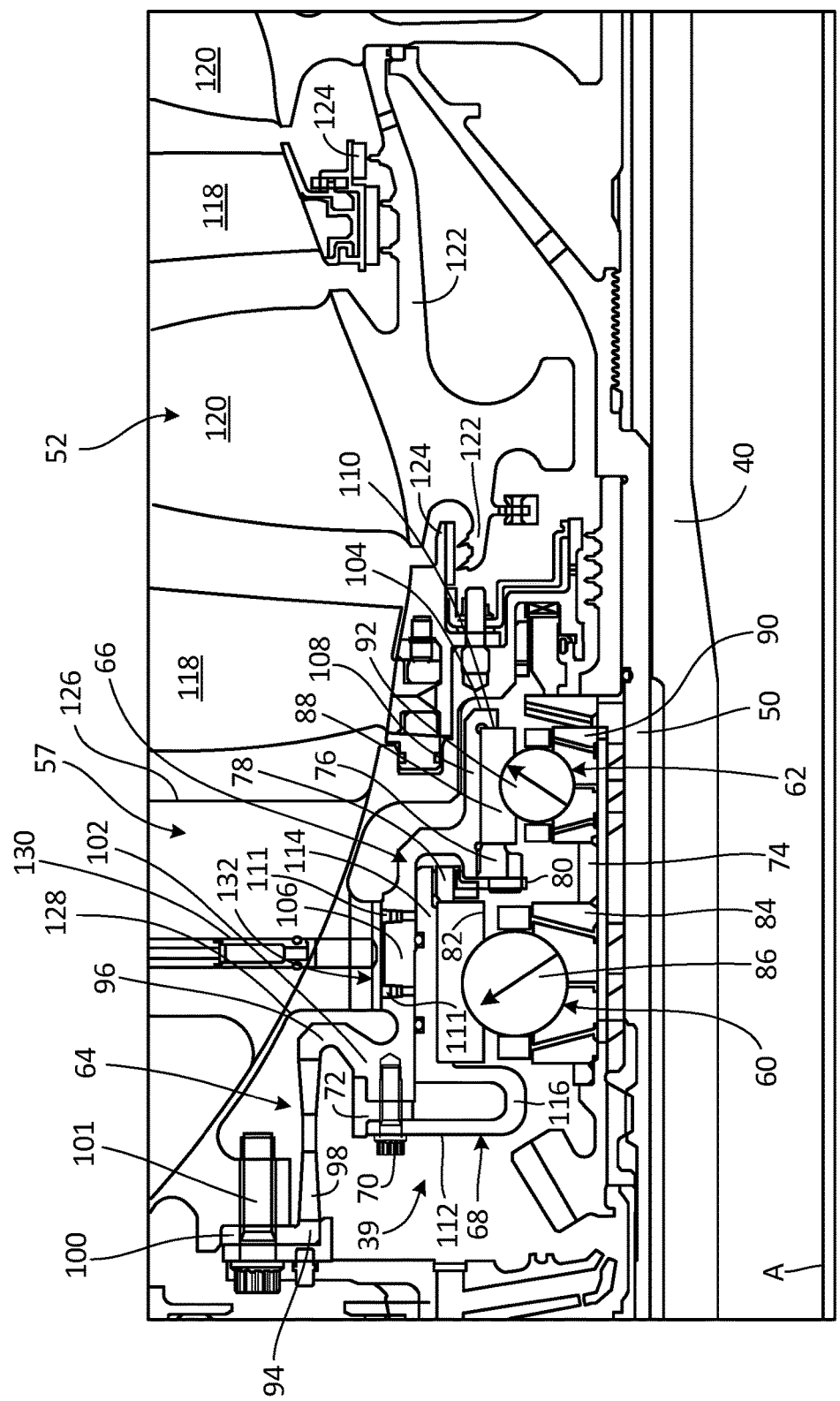
FIG. 2 is a cross-sectional view of a thrust bearing system for the gas turbine engine of FIG. 1.

FIG. 2 is a cross-sectional view of a portion of high-pressure compressor 52 and thrust bearing system 39 for gas turbine engine 20 of FIG. 1. As shown in FIG. 2, thrust bearing system 39 includes first ball bearing assembly 60, second ball bearing assembly 62, squirrel cage 64, outer housing 66, axial spring 68, spring fasteners 70, spring spacer 72, race spacer 74, first spanner nut 76, second spanner nut 78, and anti-rotation washer 80. First ball bearing assembly 60 includes first outer race 82, first inner race 84, and the first plurality of ball bearing elements 86 (only one of which is shown in FIG. 2). Second ball bearing assembly 62 includes second outer race 88, second inner race 90, and second ball bearing elements 92 (only one of which is shown in FIG. 2). Squirrel cage 64 includes forward end 94, aft end 96, beams 98 (only one of which is shown in FIG. 2), and mounting flange 100. Outer housing 66 includes forward end 102, aft end 104, first portion 106, second portion 108, stop face 110, and piston seals 111. Axial spring 68 includes flange 112, body 114, and curved bow 116. In addition to the above listed elements, FIG. 2 also shows compressor vanes 118, compressor rotors 120, rotor seals 122, and seal lands 124 of high-pressure compressor 52. FIG. 2 also shows intermediate frame 57 from FIG. 1 with strut 126, endwall 128, and oil supply passage 130.

As shown in FIG. 2, thrust bearing system 39 is positioned circumferentially around inner shaft 40 and outer shaft 50, and positioned radially inward from intermediate frame 57. Both intermediate frame 57 and thrust bearing system 39 are positioned immediately upstream from high-pressure compressor 52. Endwall 128 of intermediate frame 57 circumferentially surrounds thrust bearing system 39 and encloses thrust bearing system 39 so as to separate thrust bearing system 39 from core airflow C. Intermediate frame 57 is stationary and does not rotate about inner shaft 40 and outer shaft 50.

Squirrel cage 64 is disposed radially inward from endwall 128 of intermediate frame 57. Mounting flange 100 extends radially outward from forward end 94 of squirrel cage 64 and is removably fastened to endwall 128 of intermediate frame 57 by fasteners 101 (only one of which is shown in FIG. 2). Fasteners 101 can be threaded fasteners, such as bolts. Aft end 96 of squirrel cage 64 is disposed downstream from forward end 94 and beams 98 extend axially between forward end 94 and aft end 96 of squirrel cage 64. Beams 98 are circumferentially spaced from one another around center axis A to create windows and increase the radial flexibility of squirrel cage 64. Squirrel cage 64 is connected to outer housing 66 of thrust bearing system 39 and functions as a radial centering spring and support cage for first ball bearing assembly 60 and second ball bearing assembly 62.

Outer housing 66 of thrust bearing system 39 is disposed radially inward of squirrel cage 64 relative center axis A. Outer housing 66 extends circumferentially around center axis A, inner shaft 40, and outer shaft 50 and is centered on center axis A. Forward end 102 of outer housing 66 is integrally connected to aft end 96 of squirrel cage 64. Outer housing 66 extends axially aft from squirrel cage 64 to aft end 104 of outer housing 66. Outer housing 66 includes first portion 106 and second portion 108. First portion 106 of outer housing 66 extends axially between forward end 102 of outer case 66 and second portion 108 of outer housing 66. Second portion 108 is integrally connected to first portion 106 and extends axially between first portion 106 and aft end 104 of outer housing 66. First portion 106 of outer housing 66 is disposed circumferentially around first ball bearing assembly 60 and second portion 108 is disposed circumferentially around second ball bearing assembly 62. Second portion 108 is smaller in diameter than first portion 106 and steps radially inward from first portion 106. As discussed below, second portion 108 is smaller in diameter than first portion 106 because second ball bearing assembly 62 is smaller in diameter than first ball bearing assembly 60.

First outer race 82 of first ball bearing assembly 60 is disposed radially inward from first portion 106 of outer housing 66 relative center axis A and is disposed circumferentially around inner shaft 40 and outer shaft 50. First inner race 84 of first ball bearing assembly 60 is disposed radially inward from first outer race 82 and is rotationally coupled to outer shaft 50 such that first inner race 84 rotates with outer shaft 50. The first plurality ball bearing elements 86 (only one of which is shown in FIG. 2) is disposed between first outer race 82 and first inner race 84. Second ball bearing assembly 62 is positioned axially aft of first ball bearing assembly 60.

Second outer race 88 of second ball bearing assembly 62 is disposed radially inward from second portion 108 of outer housing 66 and is disposed circumferentially around inner shaft 40 and outer shaft 50. Aft end 104 of outer housing 66 includes stop face 110 that extends radially inward from second portion 108 and contacts an aft end of second outer race 88 of second ball bearing assembly 62 so to axially position second ball bearing assembly 62 inside outer housing 66. Second inner race 90 of second ball bearing assembly 62 is disposed radially inward from second outer race 88 and is rotationally coupled to outer shaft 50 such that second inner race 90 also rotates with outer shaft 50. The second plurality of ball bearing elements 92 (only one of which is shown in FIG. 2) is disposed between second outer race 88 and second inner race 90.

As indicated by the arrows shown on the first plurality ball bearing elements 86 and the second plurality of ball bearing elements 92 in FIG. 2, first ball bearing assembly 60 and second ball bearing assembly 62 can be loaded back to back inside outer housing 66 so as to better distribute the thrust loads passed between outer shaft 50 and thrust bearing system 39. In alternate embodiments, the orientation of first ball bearing assembly 60 and second ball bearing assembly 62 can be reversed so that first ball bearing assembly 60 and second ball bearing assembly 62 are loaded face to face inside outer housing 66. Race spacer 74 is disposed around inner shaft 40 and outer shaft 50 and is disposed between first inner race 84 and second inner race 90 so as to axially position first ball bearing assembly 60 relative second ball bearing assembly 62 and to provide an axial load path between first ball bearing assembly 60 and second ball bearing assembly 62.

Second outer race 88, second inner race 90, and the second plurality of ball bearing elements 92 are smaller in diameter than first outer race 82, first inner race 84, and the first plurality of ball bearing elements 86 respectively. Second ball bearing assembly 62 is smaller in diameter than first ball bearing assembly 60 so as to accommodate the flowpath of high-pressure compressor 52. Typically, a ball bearing assembly as small as second ball bearing assembly 62 would wear out relatively quickly under the thrust loads produced by high-pressure compressor 52 in operation. However, axial spring 68 is provided in thrust bearing system 39 to control and moderate the thrust loads across first ball bearing assembly 60 and second ball bearing assembly 62 so as to reduce excessive wear on second ball bearing assembly 62 and dampen the effects of "bowed rotor" previously described above.

Axial spring 68 is a resilient member connected to the outer housing 66 and can be formed from any metal, such as steal, titanium, and/or nickel, that provides the necessary thermal and mechanical durability and elasticity required for the applications of axial spring 68 described below. As shown in the exemplary embodiment of FIG. 2, axial spring 68 includes flange 112, body 114, and curved bow 116. Flange 112 is connected to forward end 102 of outer housing 66 by spring fasteners 70 (only one of which is shown in FIG. 2). Spring fasteners 70 can be threaded fasteners, such as bolts. Spring spacer 72 is disposed between flange 112 of axial spring 68 and forward end 102 of outer housing 66. Spring spacer 72 axially positions axial spring 68 relative first ball bearing assembly 60. Flange 112 extends radially inward relative center axis A from forward end 102 of outer housing 66. Body 114 of axial spring 68 is disposed aft of flange 112 and extends axially parallel to center axis A. Body 114 is disposed radially between first outer race 82 and first portion 106 of outer housing 66. Curved bow 116 is disposed radially inward from flange 112 and body 114 and connects flange 112 to body 114. Curved bow 116 is configured to allow elastic deformation in axial spring 68. Curved bow 116 of axial spring 68 is disposed forward first ball bearing assembly 60 and contacts first outer race 82 of first ball bearing assembly 60. Axial spring 68 is preloaded inside thrust bearing system 39 such that curved bow 116 of axial spring 68 is compressed axially between spring fasteners 70 and first outer race 82 at all times and presses axially aftward against first outer race 82 at all times to maintain the axial position of first ball bearing assembly 60 and outer shaft 50.

Thrust bearing system 39 also includes first spanner nut 76, second spanner nut 78, and anti-rotation washer 80 to lock the axial position of first ball bearing assembly 60 and second ball bearing assembly 62 inside thrust bearing system 39. First spanner nut 76 is positioned axially forward of second ball bearing assembly 62 and aft of first ball bearing assembly 60. First spanner nut 76 is disposed radially inward from second portion 108 of outer housing 66 and is threadingly connected to an inner surface of second portion 108 of outer housing 66. First spanner nut 76 contacts second outer race 88 such that second outer race 88 is axially fixed between first spanner nut 76 and stop face 110 of outer housing 66. Fixing the axial position of second outer race 88 of second ball bearing assembly also helps maintain the axial position of second inner race 90 and outer shaft 50 because the spherical geometry of ball bearing elements 92 resists axial displacement between second outer race 88 and second inner race 90.

Second spanner nut 78 is positioned radially outward from first spanner nut 76 and is positioned radially inward of an aft end of body 114 of the axial spring 68. Second spanner nut 78 is threadingly connected to the aft end of body 114 of axial spring 68. Second spanner nut 78 contacts an aft end of first outer race 82 of first ball bearing assembly 60 such that first outer race 82 is axially fixed between curved bow 116 and second spanner nut 78 and does not move relative axial spring 68. Anti-rotation washer 80 extends radially from first spanner nut 76 to second spanner nut 78 and is configured to interlock with first spanner nut 76 and second spanner nut 78 to prevent rotation between first spanner nut 76 and second spanner nut 78. While axial play and slop is removed from first ball bearing assembly 60 and second ball bearing assembly 62 by axial spring 68, first spanner nut 78, and second spanner nut 78, intermediate frame 57, outer housing 66, and squirrel cage 64 can provide a radial spring and squeeze film oil damper 132 to remove axial play and slop from first ball bearing assembly 60 and second ball bearing assembly 62.

As shown in FIG. 2, intermediate frame 57 includes oil supply passage 130 that extends radially inward from strut 126 and through endwall 128 to deliver pressurized oil to first portion 106 of outer housing 66. Piston seals 111 are disposed between first portion 106 of outer housing 66 and endwall 128 and extend circumferentially around first portion 106. One piston seal 111 is disposed forward of oil supply passage 130 and one piston seal 111 is disposed aft of oil supply passage 130 to form squeeze film oil damper 132 between endwall 128 and first portion 106 of outer housing 66. During operation of gas turbine engine 20, pressurized oil is directed to first portion 106 of outer housing 66 by oil supply passage 130. The pressurized oil is then substantially trapped between piston seals 111, first portion 106 and endwall 128, causing the pressurized oil to push first portion 106 of outer housing 66 radially inward against first ball bearing assembly 60 and second ball bearing assembly 62. Beams 98 of squirrel cage 64 provide enough radial elasticity to allow outer housing 66 to deflect radially inward in response to the pressure provided by squeeze film oil damper 132. Because squeeze film oil damper 132 presses outer housing 66 radially inward against first ball bearing assembly 60 and second ball bearing assembly 62 during engine start-up and operation, squeeze film oil damper 132 counteracts the effects of bowed rotor by reducing radial play and radial slop in first ball bearing assembly 60, second ball bearing assembly 62, outer shaft 50, and inner shaft 40. How thrust bearing system 39 reduces bowed rotor effects during engine start-up and operation is discussed in greater detail below with reference to FIGS. 3-5.

Figure 3:
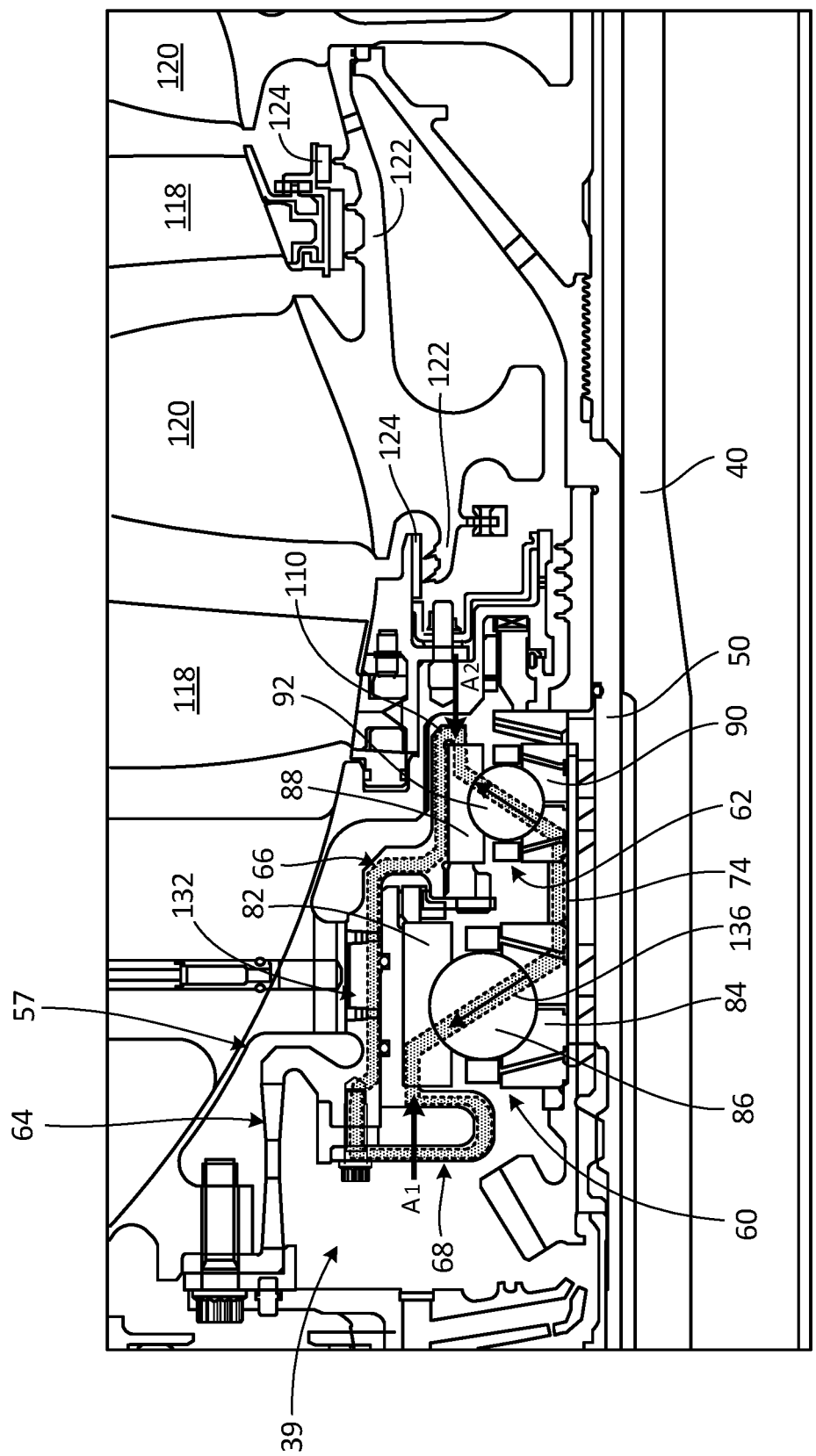
FIG. 3 is a cross-sectional view of the thrust bearing system of FIG. 2 showing a cold preload path of the thrust bearing system.
Figure 4:
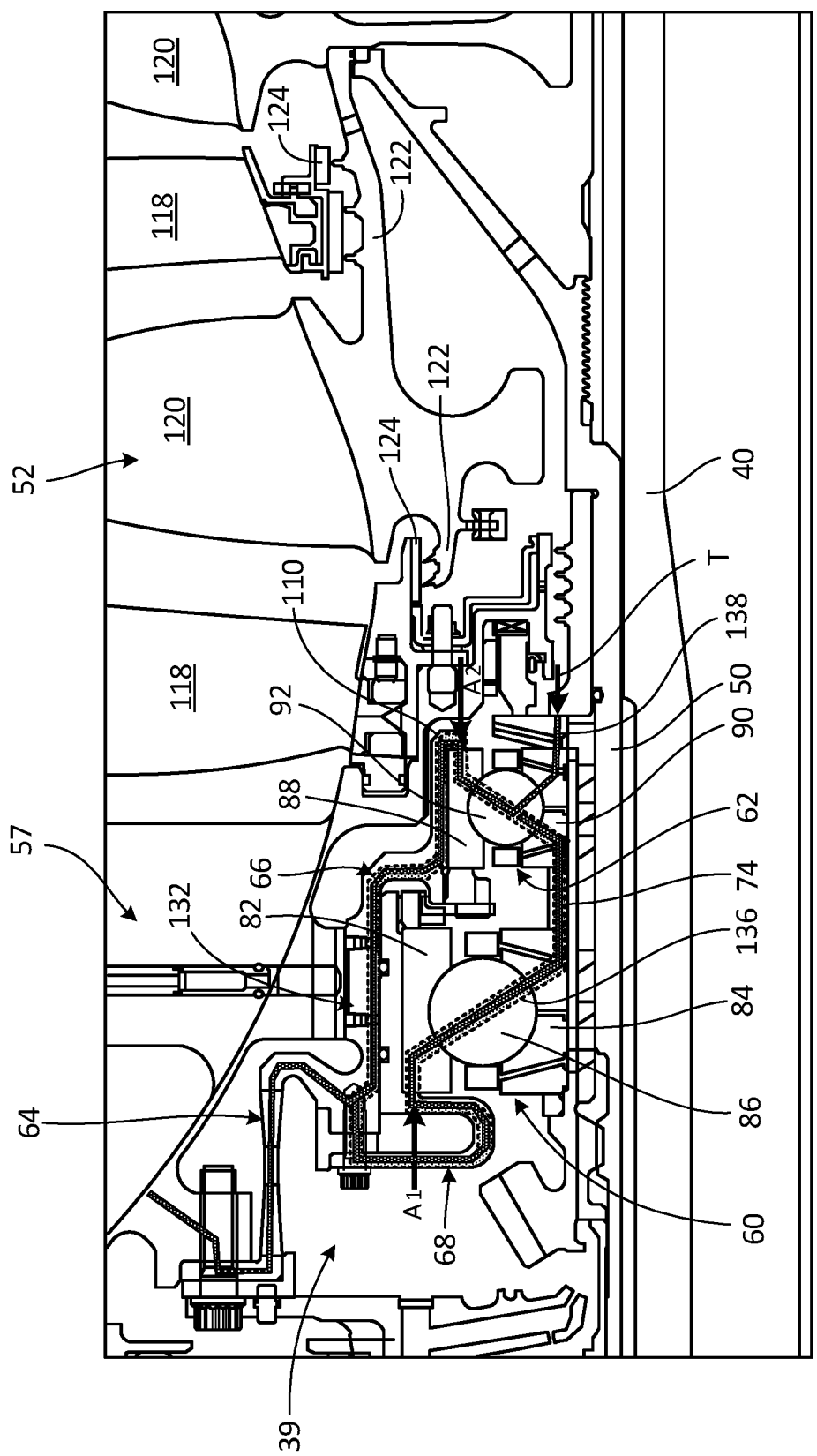
FIG. 4 is a cross-sectional view of the thrust bearing system of FIG. 2 showing the load paths of the thrust bearing system during low power and low speed conditions of the gas turbine engine.
Figure 5:
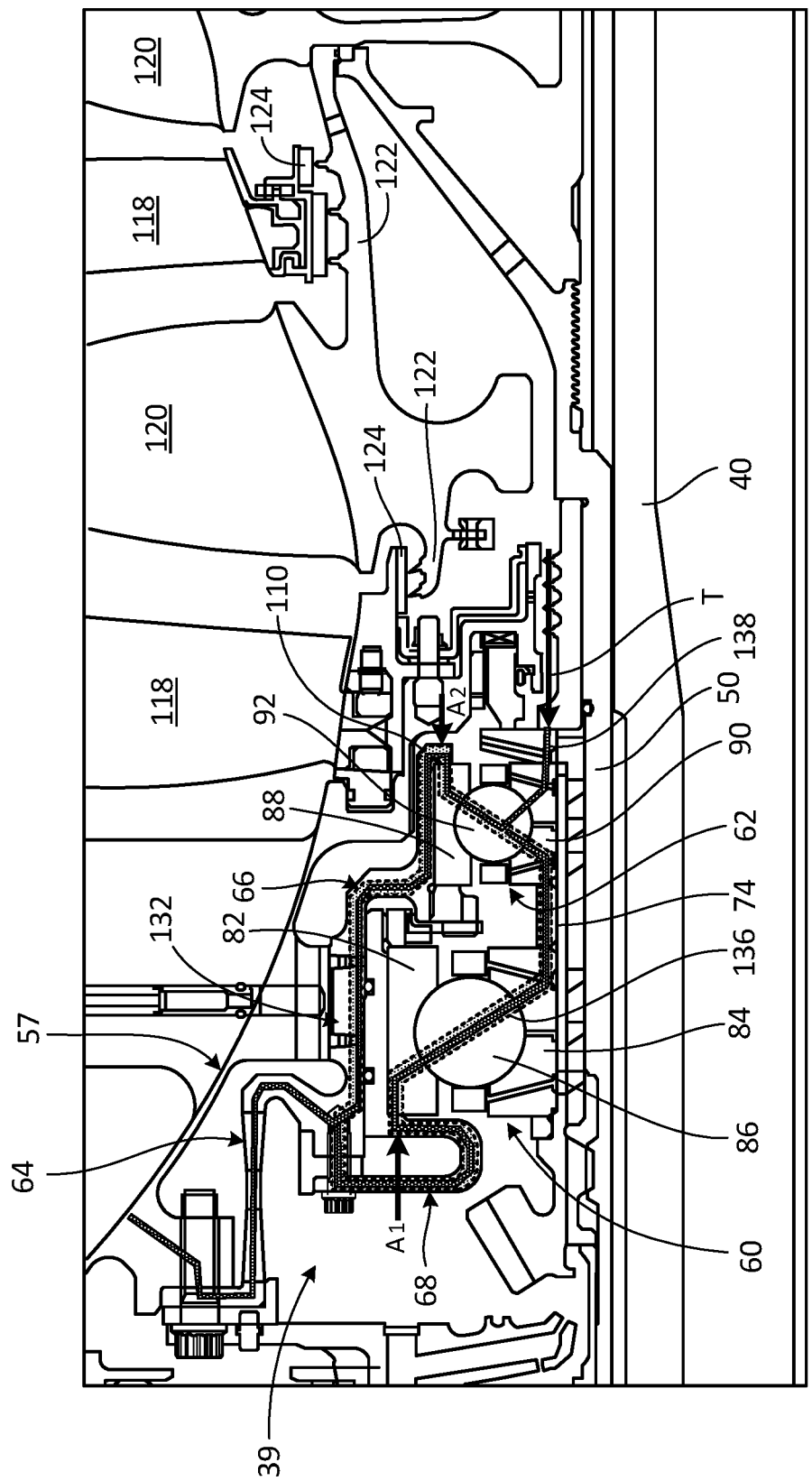
FIG. 5 is a cross-sectional view of the thrust bearing system of FIG. 2 showing the load paths of the thrust bearing system during high power and high speed conditions of the gas turbine engine.

FIGS. 3-5 will be discussed concurrently. FIG. 3 is a cross-sectional view of thrust bearing system 39 of FIG. 2 showing preload path 136 across thrust bearing system 39 during cold conditions of gas turbine engine 20. FIG. 4 is a cross-sectional view of thrust bearing system 39 showing preload path 136 along with thrust load path 138 across thrust bearing system 39 during low power and low speed conditions of gas turbine engine 20. FIG. 5 is a cross-sectional view of thrust bearing system 39 showing preload path 136 and thrust load path 138 across thrust bearing system 39 during high power and high speed conditions of gas turbine engine 20.

As shown in FIG. 3, axial spring 68 presses axially against first outer race 82 of first ball bearing assembly 60 in all conditions of gas turbine engine 20, including cold conditions when gas turbine engine 20 is off, such that axial play of first ball bearing assembly 60 and second ball bearing assembly 62 is eliminated between axial spring 68 and stop face 110, as indicated by arrows A1 and A2 in FIG. 3. The preload exerted by axial spring 68 against first outer race 82 is transferred to the first plurality of ball bearing elements 86. The first plurality of ball bearing elements 86 transfer the preload aftward and radially inward to first inner race 84. The preload is then transferred axially aftward from first inner race 84 to second inner race 90 via race spacer 74. The preload then travels radially upward and aftward across the second plurality of ball bearing elements 92 to second outer race 88 of second ball bearing assembly 62. The preload is then transferred to stop face 110 of outer housing 66 and passes through outer housing 66, thereby completing preload path 136.

During low power and low speed conditions, such as engine start-up, a net thrust load T is transferred from outer shaft 50 and high-pressure compressor 52 to second ball bearing assembly 62 and into outer housing 66, squirrel cage 64, and intermediate frame 57 along thrust load path 138, as shown in FIG. 4. Should outer shaft 50 be bowed, squeeze film oil damper 132, outer housing 66, and squirrel cage 64 will oppose and minimize any radial deflection of outer shaft 50 while axial spring 68, first ball bearing assembly 60, and second ball bearing assembly 62 will oppose and minimize any axial deflection of outer shaft 50.

As net thrust load T presses axially forward on second ball bearing assembly 62, net thrust load T opposes the preload across second ball bearing assembly 62 and begins to unload second ball bearing assembly 62 (i.e., reduce the preload felt by second ball bearing assembly 62). As net thrust load T begins to unload second ball bearing assembly 62, axial spring 68 opposes net thrust load T and increases the preload across first ball bearing assembly 60. As net thrust load T from outer shaft 50 and high-pressure compressor 52 incrementally increases, second ball bearing assembly 62 incrementally unloads while first ball bearing assembly 60 incrementally loads up. By the time gas turbine engine 20 is operating at high power and high speed conditions, as shown in FIG. 5, the majority of thrust load T is born by first ball bearing assembly 60 and the preload on second ball bearing assembly 62 completely drops off, thereby extending the operating life of second ball bearing assembly 62.

In view of the foregoing description, it will be recognized that the present disclosure provides numerous advantages and benefits. For example, the present disclosure provides spring 68, first ball bearing assembly 60, and second ball bearing assembly 62 that oppose and minimize any axial deflection that might be caused by bowed-rotor effects in outer shaft 50. Furthermore, the present disclosure provides squeeze film oil damper 132, outer housing 66, and squirrel cage 64 that oppose and minimize any radial deflection that might be caused by bowed-rotor effects in outer shaft 50. By minimizing bowed-rotor effects in gas turbine engine 20, the present disclosure reduces the start-time needed to power-up gas turbine engine and increases the efficiency of gas turbine engine 20 by reducing tip leakage caused by bowed-rotor in high-pressure compressor 52. Reducing bowed-rotor effects in high-pressure compressor 52 also protects rotor seals 122 and seal lands 124 in high-pressure compressor 52 from moving relative one another and causing leakage between compressor vanes 118 and compressor rotors 120. Furthermore, the present disclosure also improves the operating life of second ball bearing assembly 62 while decreasing the size of second ball bearing assembly 62 relative first ball bearing assembly 62 by unloading second ball bearing assembly 62 during high speed and high power operating conditions.

The following are non-exclusive descriptions of possible embodiments of the present invention.

In one embodiment, a bearing system for a gas turbine engine includes an outer housing having a forward end and an aft end. A first ball bearing assembly is disposed radially inward from the outer housing relative a center axis of the outer housing. The first ball bearing assembly includes a first outer race disposed radially inward from the outer housing, a first inner race disposed radially inward from the first outer race, and a first plurality of ball bearing elements disposed between the first outer race and the first inner race. The bearing system also includes a second ball bearing assembly disposed radially inward from the outer housing and positioned aft of the first ball bearing assembly. The second ball bearing assembly includes a second outer race disposed radially inward from the outer housing, a second inner race disposed radially inward from the second outer race, and a second plurality of ball bearing elements disposed between the second outer race and the second inner race. The bearing system also includes a resilient member connected to the outer housing. The resilient member is compressed against at least one of the first outer race and the second outer race in an axial direction parallel to the center axis.

The bearing system of the preceding paragraph can optionally include, additionally and/or alternatively, any one or more of the following features, configurations and/or additional components:

a bearing support cage comprising a forward end, an aft end, and a plurality of circumferentially spaced beams extending between the forward end and the aft end of the bearing support cage, wherein the aft end of the bearing support cage is connected to the forward end of the outer housing;

the resilient member comprises: a flange that extends radially relative the center axis; a body that extends axially parallel to the center axis; and a curved bow disposed radially inward from the flange and the body and connecting the flange to the body;

the flange of the resilient member is connected to the forward end of the outer housing, the body is disposed radially between the outer housing and the first outer race, and the curved bow of the resilient member is disposed radially inward of the outer housing and forward of the first ball bearing assembly;

the second ball bearing assembly is smaller in diameter than the first ball bearing assembly;

the outer housing comprises a step-down portion disposed circumferentially around the second ball bearing assembly, wherein the step-down portion of the outer housing is smaller in diameter than a forward portion of the outer housing, wherein the forward portion of the outer housing is disposed circumferentially around the first ball bearing assembly;

a first fastener connected to an inner surface of the step-down portion of the outer housing, wherein the first fastener is positioned axially forward of the second ball bearing assembly and aft of the first ball bearing assembly;

a second fastener positioned radially outward of the first fastener and radially inward of an aft end of the body of the resilient member, wherein the second fastener is connected to the aft end of the body of the resilient member;

an anti-rotation washer that extends radially from the first fastener to the second fastener and is configured to prevent rotation between the first fastener and the second fastener, wherein the first fastener and the second fastener are spanner nuts; and/or the aft end of the outer housing comprises a stop face that extends radially inward from the step-down portion and contacts an aft end of the second outer race of the second ball bearing assembly.

In another embodiment, a bearing system for a gas turbine engine includes an outer housing having a forward end and an aft end. The bearing system also includes a first ball bearing assembly disposed radially inward from the outer housing relative a center axis of the outer housing. The first ball bearing assembly includes a first outer race disposed radially inward from the outer housing, a first inner race disposed radially inward from the first outer race, and a first plurality of ball bearing elements disposed between the first outer race and the first inner race. The bearing system also includes a second ball bearing assembly disposed radially inward from the outer housing and positioned aft of the first ball bearing assembly. The second ball bearing assembly includes a second outer race disposed radially inward from the outer housing, a second inner race disposed radially inward from the second outer race, and a second plurality of ball bearing elements disposed between the second outer race and the second inner race. The bearing system also includes a spring. The spring is connected to the forward end of the outer housing by a fastener and contacts the first outer race. The spring is compressed axially between the fastener and the first outer race.

The bearing system of the preceding paragraph can optionally include, additionally and/or alternatively, any one or more of the following features, configurations and/or additional components:

the outer housing comprises a first portion and a second portion, wherein the first portion extends axially between the forward end of the outer case and the second portion of the outer housing, wherein the second portion extends axially between the first portion and the aft end of the outer housing, and wherein the second portion is smaller in diameter than the first portion;

the second outer race, the second inner race, and the second plurality of ball bearing elements are smaller in diameter than the first outer race, the first inner race, and the first plurality of ball bearing elements respectively;

the first portion of the outer housing is disposed around the first ball bearing assembly and the second portion of the outer housing is disposed around the second ball bearing assembly;

the spring comprises: a flange that extends radially inward from the forward end of the outer housing relative the center axis; a body disposed aft of the flange, wherein the body extends axially parallel to the center axis and is disposed radially between the first outer race and the first portion of the outer housing; and a curved bow disposed radially inward from the flange and the body and connecting the flange to the body;

a bearing support cage comprising a forward end, an aft end, and a plurality of circumferentially spaced beams extending between the forward end and the aft end of the bearing support cage, wherein the aft end of the bearing support cage is connected to the forward end of the outer housing; and/or the bearing support cage is disposed radially outward from the outer housing relative the center axis.

In another embodiment, a bearing system for a gas turbine engine includes a radial spring and an outer housing. The outer housing includes a forward end and an aft end, the forward end of the outer housing being connected to the radial spring. The bearing system also includes a first ball bearing assembly, a second ball bearing assembly, and an axial spring. The first ball bearing assembly is disposed radially inward from the outer housing relative a center axis of the outer housing. The first ball bearing assembly includes a first outer race disposed radially inward from the outer housing, a first inner race disposed radially inward from the first outer race, and a first plurality of ball bearing elements disposed between the first outer race and the first inner race. The second ball bearing assembly is disposed radially inward from the outer housing and is positioned aft of the first ball bearing assembly. The second ball bearing assembly includes a second outer race disposed radially inward from the outer housing, a second inner race disposed radially inward from the second outer race, and a second plurality of ball bearing elements disposed between the second outer race and the second inner race. The axial spring is connected to the forward end of the outer housing by a fastener and contacts the first outer race. The axial spring is compressed axially between the fastener and the first outer race.

The bearing system of the preceding paragraph can optionally include, additionally and/or alternatively, any one or more of the following features, configurations and/or additional components:

the radial spring is a squirrel cage comprising a forward end, an aft end, and a plurality of circumferentially spaced beams extending between the forward end and the aft end of the squirrel cage, wherein the aft end of the squirrel cage is connected to the forward end of the outer housing; and/or the axial spring comprises: a flange connected to the forward end of the outer housing and that extends radially inward relative the center axis from the forward end of the outer housing; a body that extends axially parallel to the center axis and that is disposed radially between the first outer race and the outer housing; and a curved bow disposed radially inward from the flange and the body and connecting the flange to the body.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while the present disclosure describes axial spring 68 being disposed forward of first ball bearing assembly 60, axial spring 68 could be disposed aft of first ball bearing assembly 60. In addition, many modifications may be made to adapt a particular situation or material to the teachings of the invention without departing from the essential scope thereof. For example, the present disclosure could be adapted for turbine section 28. Therefore, it is intended that the invention not be limited to the particular embodiment(s) disclosed, but that the invention will include all embodiments falling within the scope of the appended claims.

The invention claimed is:

1. A bearing system for a gas turbine engine comprises:
an outer housing comprising a forward end and an aft end;
a first ball bearing assembly disposed radially inward from the outer housing relative a center axis of the outer housing, wherein the first ball bearing assembly comprises:
   a first outer race disposed radially inward from the outer housing;
   a first inner race disposed radially inward from the first outer race; and
   a first plurality of ball bearing elements disposed between the first outer race and the first inner race;
a second ball bearing assembly disposed radially inward from the outer housing and positioned axially aft of the first ball bearing assembly, wherein the second ball bearing assembly comprises:
   a second outer race disposed radially inward from the outer housing;
   a second inner race disposed radially inward from the second outer race; and
   a second plurality of ball bearing elements disposed between the second outer race and the second inner race;

a resilient member connected to the outer housing, wherein the resilient member is compressed against at least one of the first outer race and the second outer race in an axial direction parallel to the center axis wherein the resilient member comprises:
a flange that extends radially relative the center axis;
a body that extends axially parallel to the center axis; and
a curved bow disposed radially inward from the flange and the body and connecting the flange to the body.

2. The bearing system of claim 1 further comprising:
a bearing support cage comprising a forward end, an aft end, and a plurality of circumferentially spaced beams extending between the forward end and the aft end of the bearing support cage, wherein the aft end of the bearing support cage is connected to the forward end of the outer housing.

3. The bearing system of claim 1, wherein the flange of the resilient member is connected to the forward end of the outer housing, the body is disposed radially between the outer housing and the first outer race, and the curved bow of the resilient member is disposed radially inward of the outer housing and forward of the first ball bearing assembly.

4. The bearing system of claim 3, wherein the second ball bearing assembly is smaller in diameter than the first ball bearing assembly.

5. The bearing system of claim 4, wherein the outer housing comprises a step-down portion disposed circumferentially around the second ball bearing assembly, wherein the step-down portion of the outer housing is smaller in diameter than a forward portion of the outer housing, wherein the forward portion of the outer housing is disposed circumferentially around the first ball bearing assembly.

6. The bearing system of claim 5, wherein the bearing system further comprises:
a first fastener connected to an inner surface of the step-down portion of the outer housing, wherein the first fastener is positioned axially forward of the second ball bearing assembly and axially aft of the first ball bearing assembly.

7. The bearing system of claim 6, wherein the bearing system further comprises:
a second fastener positioned radially outward of the first fastener and radially inward of an aft end of the body of the resilient member, wherein the second fastener is connected to the aft end of the body of the resilient member.

8. The bearing system of claim 7, wherein the bearing system further comprises:
an anti-rotation washer that extends radially from the first fastener to the second fastener and is configured to prevent rotation between the first fastener and the second fastener,
wherein the first fastener and the second fastener are spanner nuts.

9. The bearing system of claim 8, wherein the aft end of the outer housing comprises a stop face that extends radially inward from the step-down portion and contacts an aft end of the second outer race of the second ball bearing assembly.

10. A bearing system for a gas turbine engine comprises:
an outer housing comprising a forward end, an aft end, a first portion, and a second portion, wherein the first portion extends axially between the forward end of the outer housing and the second portion of the outer housing, wherein the second portion extends axially between the first portion and the aft end of the outer housing;
a first ball bearing assembly disposed radially inward from the outer housing relative a center axis of the outer housing, wherein the first ball bearing assembly comprises:
a first outer race disposed radially inward from the outer housing;
a first inner race disposed radially inward from the first outer race; and
a first plurality of ball bearing elements disposed between the first outer race and the first inner race;
a second ball bearing assembly disposed radially inward from the outer housing and positioned axially aft of the first ball bearing assembly, wherein the second ball bearing assembly comprises:
a second outer race disposed radially inward from the outer housing;
a second inner race disposed radially inward from the second outer race; and
a second plurality of ball bearing elements disposed between the second outer race and the second inner race;
a spring connected to the forward end of the outer housing by a fastener and contacting the first outer race, wherein the spring is compressed axially between the fastener and the first outer race, and wherein the spring comprises:
a flange that extends radially inward from the forward end of the outer housing relative the center axis;
a body disposed axially aft of the flange, wherein the body extends axially parallel to the center axis and is disposed radially between the first outer race and the first portion of the outer housing; and
a curved bow disposed radially inward from the flange and the body and connecting the flange to the body.

11. The bearing system of claim 10, wherein the second portion is smaller in diameter than the first portion.

12. The bearing system of claim 11, wherein the second outer race, the second inner race, and the second plurality of ball bearing elements are smaller in diameter than the first outer race, the first inner race, and the first plurality of ball bearing elements respectively.

13. The bearing system of claim 12, wherein the first portion of the outer housing is disposed around the first ball bearing assembly and the second portion of the outer housing is disposed around the second ball bearing assembly.

14. The bearing system of claim 13 further comprising:
a bearing support cage comprising a forward end, an aft end, and a plurality of circumferentially spaced beams extending between the forward end and the aft end of the bearing support cage, wherein the aft end of the bearing support cage is connected to the forward end of the outer housing.

15. The bearing system of claim 14, wherein the bearing support cage is disposed radially outward from the outer housing relative the center axis.

16. A bearing system for a gas turbine engine comprises:
a radial spring;
an outer housing comprising a forward end and an aft end, wherein the forward end of the outer housing is connected to the radial spring;
a first ball bearing assembly disposed radially inward from the outer housing relative a center axis of the outer housing, wherein the first ball bearing assembly comprises:

a first outer race disposed radially inward from the outer housing;
a first inner race disposed radially inward from the first outer race; and
a first plurality of ball bearing elements disposed between the first outer race and the first inner race;
a second ball bearing assembly disposed radially inward from the outer housing and positioned axially aft of the first ball bearing assembly, wherein the second ball bearing assembly comprises:
a second outer race disposed radially inward from the outer housing;
a second inner race disposed radially inward from the second outer race; and
a second plurality of ball bearing elements disposed between the second outer race and the second inner race;
an axial spring connected to the forward end of the outer housing by a fastener and contacting the first outer race, and wherein the axial spring is compressed axially between the fastener and the first outer race.

17. The bearing system of claim 16, wherein the radial spring is a squirrel cage comprising a forward end, an aft end, and a plurality of circumferentially spaced beams extending between the forward end and the aft end of the squirrel cage, wherein the aft end of the squirrel cage is connected to the forward end of the outer housing.

18. The bearing system of claim 17, wherein the axial spring comprises:
a flange connected to the forward end of the outer housing and that extends radially inward relative the center axis from the forward end of the outer housing;
a body that extends axially parallel to the center axis and that is disposed radially between the first outer race and the outer housing; and
a curved bow disposed radially inward from the flange and the body and connecting the flange to the body.

* * * * *